(12) United States Patent
Paini et al.

(10) Patent No.: US 11,783,001 B2
(45) Date of Patent: *Oct. 10, 2023

(54) SYSTEM AND METHOD FOR SPLITTING A VIDEO STREAM USING BREAKPOINTS BASED ON RECOGNIZING WORKFLOW PATTERNS

(71) Applicant: Bank of America Corporation, Charlotte, NC (US)

(72) Inventors: Siva Kumar Paini, Hyderabad (IN); Sakshi Bakshi, New Delhi (IN); Srinivasa Jitendra Dhanwada, Hyderabad (IN); Sudhakar Balu, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 167 days.

This patent is subject to a terminal disclaimer.

(21) Appl. No.: 17/371,086

(22) Filed: Jul. 8, 2021

(65) Prior Publication Data

US 2023/0010296 A1    Jan. 12, 2023

(51) Int. Cl.
*G06F 16/955* (2019.01)
*G06F 3/04842* (2022.01)
*G06F 16/9535* (2019.01)
*G06F 16/908* (2019.01)
*G06F 18/2413* (2023.01)

(52) U.S. Cl.
CPC ...... *G06F 16/9558* (2019.01); *G06F 3/04842* (2013.01); *G06F 16/908* (2019.01); *G06F 16/9535* (2019.01); *G06F 18/2413* (2023.01)

(58) Field of Classification Search
CPC ............... G06F 16/908; G06F 18/2413; G06F 16/9535; G06F 16/9558
See application file for complete search history.

(56) References Cited

U.S. PATENT DOCUMENTS

| | | | |
|---|---|---|---|
| 7,437,614 B2 | 10/2008 | Haswell et al. | |
| 7,823,055 B2 | 10/2010 | Sull et al. | |
| 7,881,957 B1 * | 2/2011 | Cohen | G06Q 30/08 |
| 8,255,090 B2 | 8/2012 | Frader-Thompson et al. | |
| 8,334,763 B2 | 12/2012 | Jackson | |

(Continued)

OTHER PUBLICATIONS

Paini, S. K. et al., "System And Method For Detecting Errors In A Task Workflow From A Video Stream," U.S. Appl. No. 17/370,500, filed Jul. 8, 2021, 52 pages.

*Primary Examiner* — Andrea C Leggett

(57) ABSTRACT

A system for classifying tasks based on workflow patterns detected on workflows through a real time video feed that shows steps being performed to accomplish a plurality of tasks. Each task is associated with a different set of steps. The system accesses a first set of steps known to be performed to accomplish a first task on the webpages. The first set of steps is represented by a first set of metadata. The system extracts a second set of metadata from the video feed. The second set of metadata represents a second set of steps to perform a second task. The system determines whether the second set of metadata corresponds to the first set of metadata. If it is determined that the second set of metadata corresponds to the first set of metadata, the system classifies the second task in a class to which the first task belongs.

20 Claims, 5 Drawing Sheets

(56) References Cited

U.S. PATENT DOCUMENTS

| | | |
|---|---|---|
| 8,387,122 B2 | 2/2013 | Toomim et al. |
| 8,417,715 B1 | 4/2013 | Bruckhaus et al. |
| 8,498,941 B2 | 7/2013 | Felsher |
| 8,515,937 B1 | 8/2013 | Sun et al. |
| 8,522,270 B2 | 8/2013 | Chatter et al. |
| 8,539,004 B2 | 9/2013 | Foygel et al. |
| 8,566,726 B2 | 10/2013 | Dixon et al. |
| 8,620,480 B2 | 12/2013 | Alexanian |
| 8,626,651 B2 | 1/2014 | Lin et al. |
| 8,706,569 B2 | 4/2014 | Al-Abdulqader et al. |
| 8,732,026 B2 | 5/2014 | Caballero et al. |
| 8,751,629 B2 | 6/2014 | White et al. |
| 8,805,339 B2 | 8/2014 | Ramer et al. |
| 8,959,577 B2 | 2/2015 | Epstein |
| 8,990,128 B2 * | 3/2015 | He ............... G06F 18/2431 706/12 |
| 9,335,178 B2 | 5/2016 | Nickolaou |
| 9,419,951 B1 | 8/2016 | Felsher et al. |
| 9,442,928 B2 | 9/2016 | Szucs et al. |
| 9,461,972 B1 | 10/2016 | Mehta |
| 9,594,907 B2 | 3/2017 | Duke et al. |
| 9,733,985 B2 | 8/2017 | Iyoob et al. |
| 9,740,479 B2 | 8/2017 | Diao et al. |
| 9,787,760 B2 | 10/2017 | Folkening |
| 9,875,406 B2 | 1/2018 | Haddick et al. |
| 9,954,841 B2 | 4/2018 | Rapaport et al. |
| 10,133,812 B2 | 11/2018 | Lee et al. |
| 10,356,147 B2 | 7/2019 | Drapeau et al. |
| 10,395,187 B2 * | 8/2019 | Weyl ............... G06Q 10/06311 |
| 10,546,326 B2 | 1/2020 | Publicover et al. |
| 10,817,314 B1 | 10/2020 | Ganesan et al. |
| 10,831,991 B1 * | 11/2020 | Hansen ............... G06F 40/14 |
| 10,853,097 B1 | 12/2020 | Kakhandiki |
| 2007/0260632 A1 * | 11/2007 | Parsons ............... G06F 16/958 707/999.102 |
| 2013/0167116 A1 * | 6/2013 | Mahmud ............ G06F 11/3672 717/120 |
| 2015/0006221 A1 | 1/2015 | Mermelstein |
| 2015/0161624 A1 | 6/2015 | Heath et al. |
| 2015/0256556 A1 | 9/2015 | Kaminsky |
| 2015/0341240 A1 | 11/2015 | Iyoob et al. |
| 2016/0034305 A1 | 2/2016 | Shear et al. |
| 2016/0055076 A1 | 2/2016 | Fliek et al. |
| 2016/0260182 A1 | 9/2016 | Garman |
| 2016/0323308 A1 | 11/2016 | Boyer et al. |
| 2016/0358065 A1 | 12/2016 | Gedge et al. |
| 2017/0053062 A1 | 2/2017 | Cradick et al. |
| 2017/0292154 A1 | 10/2017 | Willey et al. |
| 2017/0316324 A1 | 11/2017 | Barrett et al. |
| 2017/0374029 A1 | 12/2017 | Cianfrocca |
| 2018/0014077 A1 * | 1/2018 | Hou ............... H04N 21/25841 |
| 2018/0025157 A1 | 1/2018 | Titonis et al. |
| 2018/0337941 A1 | 11/2018 | Kraning et al. |
| 2018/0357922 A1 | 12/2018 | Dutta et al. |
| 2019/0097907 A1 | 3/2019 | Nickolov et al. |
| 2019/0236478 A1 * | 8/2019 | Wu ............... G06Q 30/0201 |
| 2020/0410389 A1 * | 12/2020 | Jain ............... G06F 9/44505 |

* cited by examiner

SYSTEM AND METHOD FOR SPLITTING A VIDEO STREAM USING BREAKPOINTS BASED ON RECOGNIZING WORKFLOW PATTERNS

TECHNICAL FIELD

The present disclosure relates generally to data processing, and more specifically to a system and method for splitting a video stream using breakpoints based on recognizing workflow patterns.

BACKGROUND

Automation engine is a software technology to automate any process or series of repeatable set of processes to perform a high volume of tasks. The automation engine processes a set of complex and comprehensive task workflows on websites or applications which are subject to failures for multiple reasons. Currently, the progress of the automation system is archived, and once the automation engine completes performing the task workflows, the archived record is evaluated through logs. The archived record is evaluated manually by an operator. This process is time-consuming and error-prone. It is challenging to evaluate complex task workflows performed by an automation engine, and determine whether the automation system is performing these complex task workflows accurately. Current technology is not configured to provide a reliable and efficient solution to evaluate failures and provide point of failures for troubleshooting in automation systems.

SUMMARY

Current technology is not configured to provide a reliable and efficient solution to evaluate automation systems, and provide points of failure. This disclosure contemplates systems and methods for monitoring and evaluating automation systems. This disclosure further contemplates troubleshooting the automation systems, and thus, improving underlying functions of the automation systems.

For example, assume that an automation engine is executed to test functionalities of various components on a website, software, mobile, web application, or any other system. In this example, the automation engine may emulate user's actions for performing various steps, activates, and navigating through webpages of the website. For each task on the website or application, the automation engine may be configured to perform a series of steps.

For example, assume that a task is to approve an account that a user requested to open on the website. To test this functionality on the website, the automation engine is configured to launch a first webpage, emulate entering a sample text (e.g., sample user information provided to the automation engine in a script file), and emulate pressing a "submit" button on the webpage. In other examples, the automation engine may be configured to perform and test other tasks and functionalities on the website, such as rejecting an account, logging into an account, determining whether a hyperlink on a webpage is functional, determining whether a button on a webpage is functional, etc. Thus, in this manner, the disclosed system may execute the automation engine to perform and test any task and function that can be performed on one or more webpages of the website.

In parallel to executing the automation engine, the disclosed system executes an evaluation engine. The evaluation engine is executed to evaluate the process of the automation engine and the progress of each task being performed by the automation engine. The automation engine may perform multiple tasks one after another without separating the tasks. In current technology, an operator manually reviews the performance of the automation engine and the tasks to evaluate whether the automation engine is performing the tasks accurately. Thus, the process of evaluating the automation engine and each task is time-consuming and error-prone. To address this problem, the evaluation engine is configured to separate the tasks performed by the automation engine.

To separate the tasks, the evaluation engine records a video of every task performed by an automation engine workflows (e.g., in real time, periodically, or on demand) and stores the tasks based on user input. In this operation, as the automation engine performs different tasks on the system, webpages, or software, mobile, web applications, the evaluation engine records a video feed of this process for each task. From the video feed, the evaluation engine extracts metadata. For example, the evaluation engine implements machine learning pattern analysis and video processing to detect various steps being performed by the automation engine. The metadata may represent the series of steps performed by the automation engine, webpage navigation patterns, and any other activities performed by the automation engine. The metadata may further include timestamps of the detected series of steps, memory utilization and CPU utilization of a computing system where the automation engine is performing the series of steps, and any other data associated with the computing device. The evaluation engine uses this information to detect errors in any of the series of steps performed by the automation engine.

The dynamic evaluation engine detects the series of steps being performed by the automation engine from the extracted metadata. For example, assume that the evaluation engine detects a first set of steps from the metadata. The first set of steps may be referred to as a first workflow. The evaluation engine determines that the first set of steps is for performing a first task. To this end, the evaluation engine uses a training dataset that comprises a plurality of sets of metadata, where each set of metadata represents a different set of steps. Each set of steps is known to be performed to accomplish a particular task. The evaluation engine compares first set of metadata that represents the first set of steps with each set of metadata that represents a different set of steps from the training dataset.

For example, assume that the evaluation engine compares the first set of metadata with a second set of metadata that represents a second set of steps that is known to be performed to accomplish the first task. If the first set of metadata corresponds to the second set of metadata, the evaluation engine determines that the first set of steps is for performing the first task. In response, the evaluation engine splits the video feed at a breakpoint whether the first task ends.

The evaluation engine determines valid breakpoints based on the cognitive Machine Learning engine's output to separate every two adjacent tasks recorded on the video feed. Thus, the evaluation engines may split the video feed into multiple video recordings, where each video recording shows a single task.

In some embodiments, the evaluation engine may detect errors or failures in the video recordings of the tasks. For example, assume that a particular task that is being performed by the automation engine fails. For example, the particular task may fail if a webpage does not load, an element on a webpage (e.g., a button, a hyperlink, etc.) is not functional, CPU and/or memory utilization is more than a threshold percentage causing the website, web browser, or the computing device to crash, etc.

The evaluation engine evaluates each step as it is being performed by the automation engine, and determines whether the step occurred where the task failed. In response to determining that a particular step where the failure occurred, the evaluation engine flags the step as a failed step. The evaluation engine also increments an error counter of the particular task that failed by one.

The evaluation engine may report the failed step to an operator for troubleshooting. Upon troubleshooting, the evaluation engine may record a video of the automation executing the particular task, and determine whether the particular task failed again. If the evaluation engine determines that the particular task failed again, the evaluation engine increments the error counter of the particular task again by one. In this manner, the evaluation engine may keep track of performance of the tasks and the automation engine testing various tasks and functions on the website.

In some embodiments, the evaluation engine may archive the video recording according to user requests. For example, a user may specify to only record the most recent video recording of a task associated with a first workflow (e.g., approving an account) performed by the automation engine. In this example, the evaluation engine may only store the most recent video recoding of the task associated with the first workflow, and erase the previous video recordings that show the first workflow. In another example, the user may specify to only record the three most recent video recordings of tasks associated with a second workflow (e.g., rejecting an account) performed by the automation engine. In this example, the evaluation engine may only store the three most recent video recordings of the task associated with the second workflow, and erase the previous video recordings that show the second workflow.

In some embodiments, the evaluation engine may archive the video recording according to available memory capacity of a computer system tasked to store the video recordings. For example, if the evaluation engine determines that the available memory capacity of the computer system is below a threshold percentage, (e.g, 10%, etc.), the evaluation engine may erase the previous video recordings stored before a certain timestamp, and keep the most recent video recordings. In this manner, less memory capacity is used to store the video recordings. Thus, the disclosed system improves the memory utilization of computer system tasked to store the video recordings. Furthermore, the disclosed system uses the most recent and relevant data by storing the most recent video recordings of workflows, which aids adapting to the latest changes in task workflows.

With respect to a system for classifying tasks based on workflow patterns detected on webpages, in one embodiment, the system comprises a memory and a processor. The memory is operable to store a first set of steps known to be performed to accomplish a first task on one or more webpages, where the first set of steps is represented by a first set of metadata. The processor is operably coupled with the memory. The processor accesses a video feed that shows a plurality of steps being performed to accomplish a plurality of tasks on the one or more webpages. Each task from among the plurality of tasks is associated with a different set of steps from among the plurality of steps. The plurality of tasks comprises a second task. The processor extracts a second set of metadata from the video feed, where the second set of metadata represents a second set of steps being performed on the one or more webpages. The processor compares the second set of metadata with the first set of metadata. The processor determines whether the second set of metadata corresponds to the first set of metadata. In response to determining that the second set of metadata corresponds to the first set of metadata, the processor determines that the second task corresponds the first task, and classifies the second task in a first workflow class to which the first task belongs.

With respect to a system for detecting errors in task workflows from a video feed, in one embodiment, the system comprises a memory and a processor. The memory is operable to store a first set of steps known to be performed to accomplish a first task on one or more webpages, where the first set of steps is represented by a first set of metadata. The processor is operably coupled with the memory. The processor records a video feed that shows a plurality of steps being performed to accomplish a plurality of tasks on the one or more webpages. Each task from among the plurality of tasks is associated with a different set of steps from among the plurality of steps. The plurality of tasks comprises a second task. The processor extracts a second set of metadata from the video feed, where the second set of metadata represents a second set of steps being performed on the one or more webpages. The processor compares the second set of metadata with the first set of metadata. The processor determines whether the second set of metadata corresponds to the first set of metadata. In response to determining that the second set of metadata corresponds to the first set of metadata, the processor determines that the second task has the same task workflow as the first task. The processor determine whether the second task fails by determining whether a webpage on which the second task is being performed crashes. In response to determining that the second task fails, the processor identifies a particular step from among the second set of steps where the second task fails. The processor flags the particular step as a failed step. The processor reports the flagged step for troubleshooting.

The disclosed system provides several practical applications and technical advantages, which include: 1) technology that reduces computational complexity of evaluating the performance of an automation engine by recording a video feed that shows a series of tasks being performed by the automation engine on applications, splitting the video feed into a plurality of video recordings, where each video recording from among the plurality of video recording shows a single task, and evaluating each video recording one at a time and/or evaluating multiple video recordings simultaneously to detect one or more points of failures in one or more tasks; 2) technology that improves underlying operation of the automation engine by detecting failed steps shown in each video recording during evaluation of each video recording and/or evaluation of multiple video recordings simultaneously; 3) technology that detects various task workflow patterns performed by the automation engine from the video feed by extracting metadata from the video feed, and detecting a series of steps known to be performed to accomplish different task workflows from the video feed; 4) technology that uses breakpoints to separate two adjacent task workflows shown in the video feed; 5) technology that, by processing the video feed, detects a particular step or datapoint where a task fails; 6) technology that extracts metadata from the video feed, and uses the metadata to detect the particular step or datapoint where the task fails; and 7) technology that, upon detecting a new task workflow that has not been recorded in a training dataset, adds the new task workflow to the training dataset.

Accordingly, the disclosed system may be integrated into a practical application of reducing computational complexity of evaluating the automation engine by splitting the video feed into multiple video recordings, where each video recording shows a single task. Thus, neither the automation engine nor the evaluation engine need to process the entire video feed for evaluation and detecting failed steps of performing tasks. Instead, the evaluation engine may process each video recording one at a time, or multiple video recordings at the same time for evaluation and detecting failed steps. This, in turn, leads to an additional practical application of increasing efficiency in utilizing processing and storage capacity resources for processing the video feed and detecting failed steps. Furthermore, the disclosed system may be integrated into an additional practical application of improving evaluation of the automation engine. For example, assume that the automation engine is performing multiple different task flows on webpages one after another. Also, assume that it is desired to evaluate whether the automation engine is performing a particular task flow as expected. By implementing the disclosed system, neither the automation engine nor the evaluation engine need to process the entire video feed to determine whether the evaluation engine performed the particular task flow as expected, because the disclosed system allows fetching video recordings that only show the particular task flow performed by the automation engine. This, in turn, provides an additional practical application of improving processing and memory utilization by the automation engine and the evaluation engine, because these engines do not need to process and search the entire video feed to find a snippet that shows the particular task flow. Instead, since the disclosed system classifies the video recordings that show the same task flow in the same task flow class, the evaluation engine only needs to fetch and process those video recordings that show the particular task flow to evaluate whether the automation engine performed the particular task flow as expected.

As such, the disclosed system may improve the current data processing and automation implementation technologies by executing the evaluation engine that is configured to record a video of the progress of the automation engine performing various task workflows on applications, detect each task workflow, split the video feed into multiple video recordings using breakpoints where each task ends, where each video recording shows a single task, and detect a particular step where a task fails.

The disclosed system further improves processing and memory utilization of computing devices tasked to execute the automation engine by archiving the most recent and relevant video recordings of task workflows. Thus, the disclosed system may reduce the processing and memory resources that would otherwise be spent using the current data processing and automation implementation technologies.

The disclosed system may further be integrated into an additional practical application of creating an improved automation engine, where the progress of the automation engine performing automated tasks (e.g., on webpages, software applications, etc.) is monitored and recorded in a video feed, and evaluated by the evaluation engine using the video feed.

Furthermore, the disclosed system may further be integrated into an additional practical application of improving troubleshooting of the automation engine by executing the evaluation engine in parallel to detect particular steps where tasks fail.

Furthermore, the disclosed system may further be integrated into an additional practical application of creating an improved evaluation engine that is capable of detecting each task workflow from among a plurality of task workflows being performed by the automation engine, split the video feed using breakpoints where each task workflow ends, and detect particular steps where a task workflow fails.

The disclosed system may further be integrated into an additional practical application of improving underlying operations of an application. By implementing the improved automation engine and the evaluation engine, errors, faulty functions, and faulty elements of an application are detected more accurately. Thus, such errors, faulty functions, and faulty elements can be addressed, for example, by correcting and/or revising the backend development of the applications.

Furthermore, the disclosed system may detect the cause and source of such errors, faulty functions, and faulty elements by detecting the particular steps where these failure occurred. For example, the disclosed system may determine that the cause of the failure in a task workflow is that CPU utilization of the computer system was more than a threshold percentage that caused the computer system to crash or shut down. In another example, the disclosed system may determine that the cause of the failure in a task workflow is that an element (e.g., hyperlink, button, etc.) on a webpage is not functional. Thus, the disclosed system may further be integrated into additional practical applications, including ease of use, fewer resources needed, faster implementation and response, and more accurate verification and troubleshooting automation engines configured to automate testing functions of websites, and any other automation engines configured to automate testing underlying functions of any system and device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
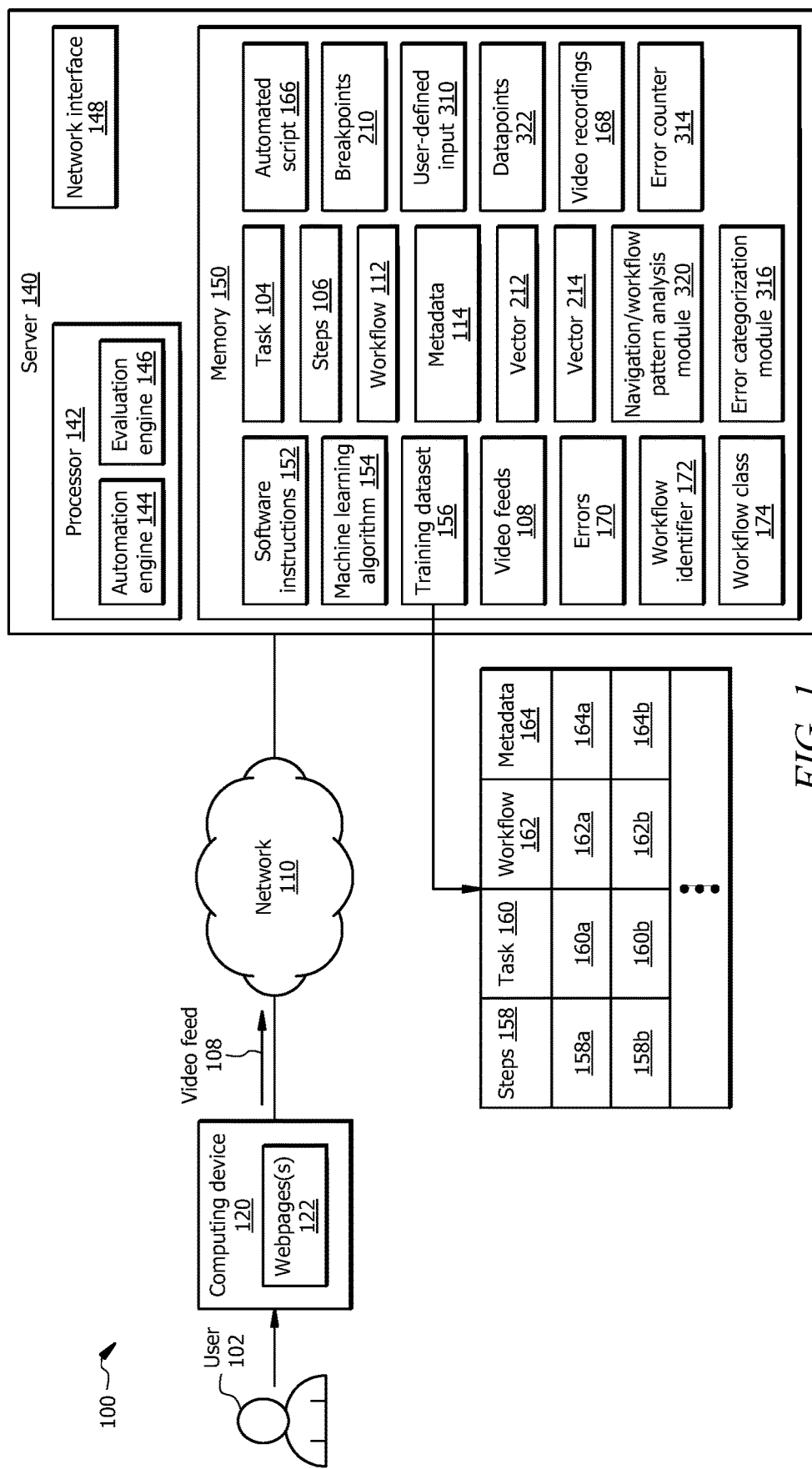
FIG. 1 illustrates an embodiment of a system configured to implement an evaluation engine to evaluate an automation engine.

As described above, previous technologies fail to provide efficient and reliable solutions for evaluating and troubleshooting an automation engine. This disclosure provides various systems and methods for evaluating and troubleshooting an automation engine. In one embodiment, system 100 for implementing an evaluation engine to evaluate an automation engine is described in FIG. 1. In one embodiment, an operational flow 200 of system 100 of FIG. 1 for classifying tasks based on workflow patterns detected on webpages from a video feed is described in FIG. 2. In one embodiment, an operational flow 300 of system 100 of FIG. 1 for detecting errors in task workflows shown in a video feed is described in FIG. 3. In one embodiment, a method 400 for classifying tasks based on workflow patterns detected on webpages from a video feed is described in FIG. 4. In one embodiment, a method 500 for detecting errors in task workflows shown in a video feed is described in FIG. 5.

Example System for Evaluating and Troubleshooting an Automation Engine

FIG. 1 illustrates one embodiment of a system 100 that is configured to evaluate and troubleshoot an automation engine 144. In one embodiment, system 100 comprises a server 140. In some embodiments, system 100 further comprises a network 110 and a computing device 120. Network 110 enables communication between components of system 100. Server 140 comprises a processor 142 in signal communication with a memory 150. Memory 150 stores software instructions 152 that when executed by the processor 142, cause the processor 142 to perform one or more functions described herein. For example, when the software instructions 152 are executed, the processor 142 executes the automation engine 144 and an evaluation engine 146. For example, the automation engine 144 is executed to perform a series of steps 106 on one or more webpages 122 in order to perform or accomplish a task 104. In another example, the evaluation engine 146 is executed to evaluate the performance of the automation engine 144. For example, the evaluation engine 146 may 1) record a video feed 108 that shows the series of steps 106 being performed by the automation engine 144 on the one or more webpages 122; 2) recognize navigation patterns between the webpages 122 performed by the automation engine 144; 3) recognize activities and steps 106 being performed by the automation engine 144 on each webpage 122; 4) split the video feed 108 based on detecting breakpoints 210 that separate every two adjacent different tasks 104; and 5) detect a particular step 106 that caused a failure in a task 104. In other embodiments, system 100 may not have all of the components enumerated and/or may have other elements instead of, or in addition to, those enumerated above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120.

A user 102 may navigate to one or more webpages 122, and perform one or more specific steps 106 to accomplish or perform a task 104. In some examples, the task 104 may include creating an account in a particular website associated with a webpage 122, accessing an account in a particular website associated with a webpage 122, approving an account, rejecting an account, etc. In other examples, the task 104 may include human resources-related task, such as retrieving a file associated with a user, inputting or updating the file, etc. In other examples, the task 104 may include any other task 104 that can be performed on one or more webpages 122. The steps 106 for performing task 104 may include inputting a first text in a first text field on a webpage 122, selecting a first button on a webpage 122, and selecting a first hyperlink on a webpage 122, and/or any other activity that can be performed on a webpage 122. Although, FIG. 1 describes webpages 122, one of ordinary skill in the art would recognize other embodiments. For example, the automation engine 144 may perform a series of steps 105 on a software, mobile, or web application, or any other system.

In some cases, the process of performing the task 104 may fail due to one or more errors 170 including a webpage 122 cannot be loaded, a website associated with a webpage 122 is down, a memory and/or CPU utilization of the computing device 120 is over a threshold percentage (e.g., over 90%, 95%, etc.) that caused a web browser application where the webpage 122 is launched to time-out, i.e., crash. Thus, the automation engine 144 may be executed to test every function and scenario that can be performed on the webpages 122 to perform the tasks 104 and workflows 112. For example, the automation engine 144 may be given an automated script 166 to execute that includes code and instructions to navigate to particular webpages 122 and perform one or more steps 106 to test whether or not the task 104 is performed successfully. Thus, to this end, the processor 142 executes the automation engine 144.

In parallel, the processor 142 executes the evaluation engine 146 to determine whether the task 104 is performed successfully, and in a case of a failure, which one or more steps 106 caused the failure in the task 104, or which steps 106 occurred when the failure occurred. In other words, the evaluation engine 146 evaluates the performance of the automation engine 144. The evaluation engine 146 may further determine whether the automation engine 144, automated script 166, and/or any variable, such that the one or more errors 170 mentioned above caused a failure in performing the task 104. The process of executing the automation engine 144 and the evaluation engine 146 is described in more detail below in conjunction with the operational flows 200 and 300 of system 100 described in FIGS. 2 and 3, respectively, and methods 400 and 500 described in FIGS. 4 and 5, respectively.

In one embodiment, the processor 142 may execute the automation engine 144 to perform multiple different tasks 104. For example, the automation engine 144 may perform a first task 104 on a first computing device 120, a second task 104 on a second computing device 120, and so on. In this example, the first task 104 may be approving an account on a website associated with a webpage 122. Thus, the steps 106 to perform the first task 104 may include inputting a name of a user 102 to a text field on a webpage 122, selecting a submit button on the webpage 122, verifying the user 102 by prompting the user 102 to provide a passcode or verifying a captcha picture, and determining whether the user input matches with the relevant data on the backend, and in response to determining that the user input does match the data on the backend, approve the account.

In this example, the second task 104 may be rejecting an account on a website associated with a webpage 122. Thus, the steps 106 to perform the second task 104 may include inputting a name of a user 102 to a text field on a webpage 122, selecting a submit button on the webpage 122, verifying the user 102 by prompting the user 102 to provide a passcode or verifying a captcha picture, and determining whether the user input matches with the data on the backend, and in response to determining that the user input do not match the data on the backend, reject creating the account.

For each task 104 from the multiple tasks 104, the processor 142 may execute the evaluation engine 146 in parallel with the automation engine 144.

Server

Server 140 is generally a server or any other device configured to process data and communicate with computing devices (e.g., computing device 120), databases, etc., via the network 110. The server 140 is generally configured to oversee the operations of the automation engine 144 and evaluation engine 146, as described further below in conjunction with the operational flows 200 and 300 of system 100, and methods 400 and 500 described in FIGS. 2 to 5, respectively.

Processor 142 comprises one or more processors operably coupled to the memory 150. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 152) to implement the automation engine 144 and evaluation engine 146. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more steps of methods 400 and 500 as described in FIGS. 4 and 5, respectively.

Network interface 148 is configured to enable wired and/or wireless communications (e.g., via network 110). The network interface 148 is configured to communicate data between the server 140 and other devices (e.g., computing device 120), databases, systems, or domains. For example, the network interface 148 may comprise a WIFI interface, a local area network (LAN) interface, a wide area network (WAN) interface, a modem, a switch, or a router. The processor 142 is configured to send and receive data using the network interface 148. The network interface 148 may be configured to use any suitable type of communication protocol as would be appreciated by one of ordinary skill in the art.

Memory 150 may be volatile or non-volatile and may comprise a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 is operable to store the software instructions 152, machine learning algorithm 154, training dataset 156, video feeds 108, workflow classes 174, tasks 104, steps 106, workflow 112, metadata 114, vector 212, vector 214, automated script 166, breakpoints, user-defined inputs 310, datapoints 322, workflow identifier 172, navigation and workflow pattern analysis module 320, errors 170, video recordings 168, error categorization module 316, error counter 314, and/or any other data or instructions. The software instructions 152 may comprise any suitable set of instructions, logic, rules, or code operable to execute the processor 142.

Automation Engine

Automation engine 144 may be implemented by the processor 142 executing software instructions 152, and is generally configured to automatically perform steps 106 on one or more webpages 122 in order to perform a task 104.

In one embodiment, the automation engine 144 may receive the automated script 166 as an input to perform the steps 106 on the webpages 122. The automated script 166 may include code and/or instructions to perform the steps 106 in a particular sequence. For example, the automated script 166 may include instructions to launch a first webpage 122, perform a first step 106 on the first webpage 122 (e.g., click on a first button), click on a hyperlink on the first webpage 122 that opens a second webpage 122, click on a second button on the second webpage 122, and/or the like. In this manner, by executing the automated script 166, the automation engine 144 emulates what a user 102 would do on the webpages 122 to perform a particular task 104.

In one embodiment, different automated scripts 166 may be fed to the automation engine 144 to perform different tasks 104, where each automated script 166 may include code to perform a different task 104. The automation engine 144 may execute one or more automated scripts 166 on one or more computing devices 120 and/or the server 140.

For example, the automation engine 144 may execute a first automated script 166 to perform a first task 104 on a first computing device 120, a second automated script 166 to perform a second task 104 on the second computing device 120, and so on. In another example, the automation engine 144 may execute a first set of automated scripts 166, each configured to perform a different task 104 on a first computing device 120, and a second set of automated scripts 166, each configured to perform a different task 104 on a second computing device 120, and so on. The process of the automation engine 144 performing tasks 104 on webpages 122 is monitored and evaluated by the evaluation engine 146, as described below.

Evaluation Engine

Evaluation engine 146 may be implemented by the processor 142 executing the software instructions 152, and is generally configured to 1) evaluate the performance of the automation engine 144, 2) record a video feed 108 that shows the series of steps 106 being performed on the one or more webpages 122; 3) recognize navigation patterns between the webpages 122; 4) recognize activities and steps 106 being performed on each webpage 122; 5) split the video feed 108 based on detecting breakpoints 210 that separate every two adjacent sets of steps 106 for performing two different tasks 104; 6) detect a particular step 106 that caused a failure in a task 104; and 7) flag the failed step 106 for troubleshooting. Each of these operations of the evaluation engine 146 is describes in detail in conjunction with the operational flows 200 and 300 of the system 100 described in FIGS. 2 and 3, respectively.

In one embodiment, the evaluation engine 146 may be implemented by a machine learning algorithm 154. For example, the machine learning algorithm 154 may comprise support vector machine, neural network, random forest, k-means clustering, etc. The machine learning algorithm 154 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the machine learning algorithm 154 may be implemented by Natural Language Processing (NLP). In another example, the machine learning algorithm 154 may be implemented by video signal processing, image processing, object detection and recognition, character detection and recognition, among others.

The evaluation engine 146 may be configured to detect or recognize webpage navigation patterns and steps 106 being performed by the automation engine 144 and/or the user 102 on the webpages 122. To this end, the evaluation engine 146 is trained by the training dataset 156.

The training dataset 156 may include various workflows 162 each known to be used to perform a particular task 160. Each workflow 162 may include one or more steps 158. Thus, the training dataset 156 may include various sets of steps 158 each known to be used to perform a particular task 160. For example, the training dataset 156 may include a first set of steps 158a that is known to be used to perform a first task 160a. The first set of steps 158a corresponds to a first workflow 162a. In another example, the training dataset 156 may include a second set of steps 158b that is known to be used to perform a second task 160b. The second set of steps 158b corresponds to a second workflow 162b. The training dataset 156 may include other workflows 162 as well. The evaluation engine 146 may use the training dataset 156 to detect steps 106 of performing tasks 104 on the webpages 122, as described in the operational flow 200 of system 100 described in FIG. 2.

Each workflow 162 is associated with a set of metadata 164. Each set of metadata 164 uniquely identifies its corresponding workflow 162, steps 158 and task 160. For example, the first workflow 162a is associated with the first set of metadata 164a, the second workflow 162b is associated with the second set of metadata 164b, and so on. The evaluation engine 146 compares each set of metadata 164 with a set of metadata 114 extracted from the video feed 108 to determine to which task 160 (and workflow 162) the task 104 (and workflow 112) correspond to, respectively. This process is described in conjunction with the operational flow 200 of system 100 described in FIG. 2.

Figure 2:
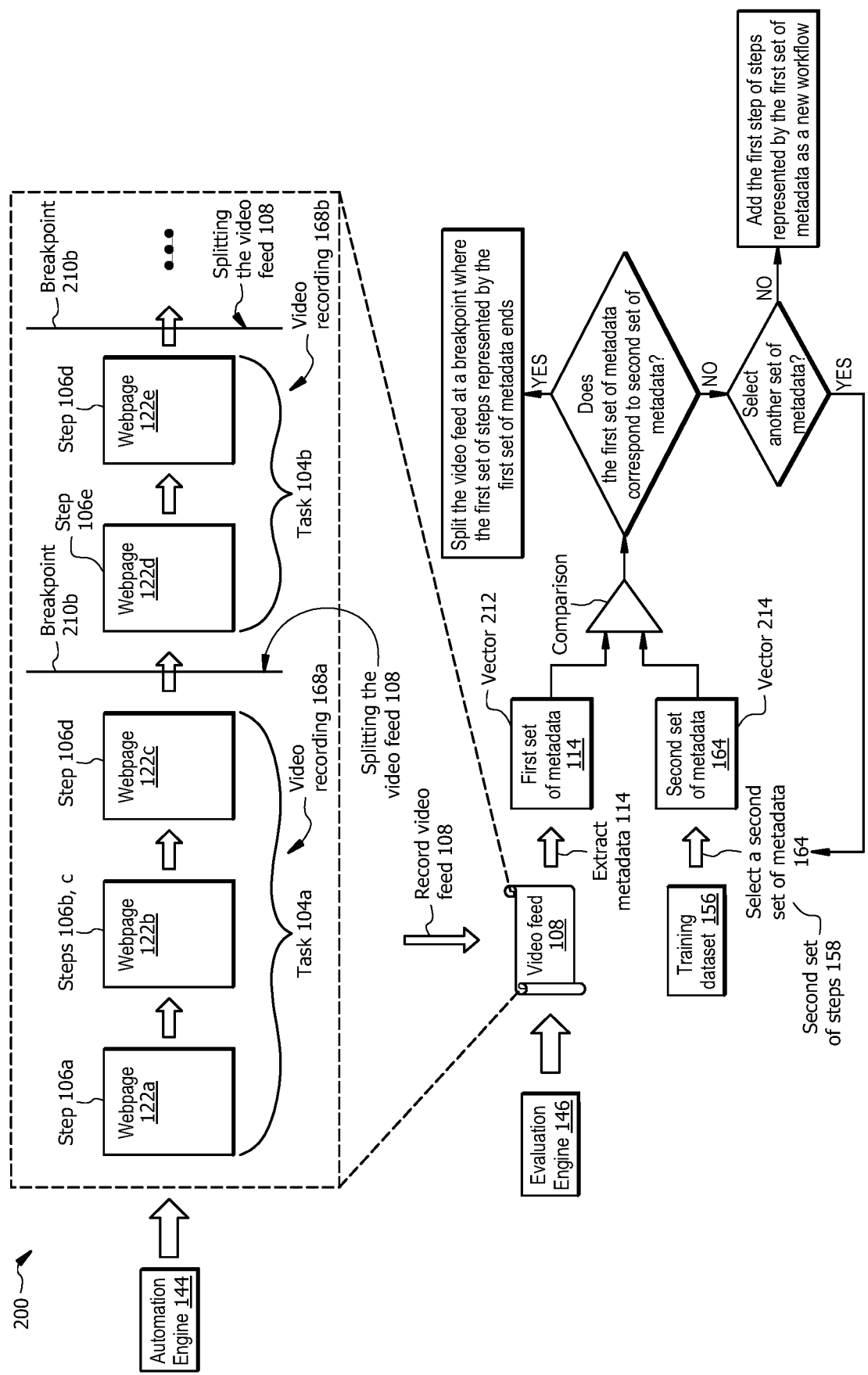
FIG. 2 illustrates an example operational flow of system 100 of FIG. 1 for classifying tasks based on workflow patterns detected on webpages from a video feed.

Example Operational Flow for Classifying Tasks based on Workflow Patterns Detected on Webpages from a Video Feed FIG. 2 illustrates an operational flow 200 of system 100 of FIG. 1 for detecting steps 106 of performing tasks 104 on the webpages 122, splitting a video feed 108 based on detecting breakpoints 210 that separate two adjacent sets of steps 106 for performing two different tasks 104, and classifying the tasks 104 based on their workflow patterns detected on the webpages 122.

Executing the Automation Engine to Perform a Task on Webpages

The operational flow 200 of system 100 of FIG. 1 begins when the processor 142 receives a request or instruction, e.g., from a user 102 to test whether functions and elements on the webpages 122 are operational. In other words, the processor 142 receives a request to test whether one or more tasks 104 can be performed successfully on the webpages 122. In response to receiving the request, the processor 142 executes the automation engine 144 to perform the one or more tasks 104 on the webpages 122.

In this process, the automation engine 144 may take the automated script 166 as an input to perform the one or more task 104, similar to that described above. Upon execution of the automated script 166, the automation engine 144 launches the webpages 122 and performs the steps 106 in a particular sequence indicated in the automated script 166.

In the example of FIG. 2, the automation engine 144 launches webpages 122a to 122c to perform the task 104a by performing steps 106a to 106d; and launches webpages 122d and 122e to perform the task 104b by performing steps 106e and 106d. The automation engine 144 may also launch other webpages 122 to perform other tasks 104.

In this process, the automation engine 144 launches a first webpage 122a and performs the step 106a on the webpage 122a. For example, the automation engine 144 may emulate clicking on a particular hyperlink on the first webpage 122a. The hyperlink may be linked to a second webpage 122b. The automation engine 144 launches the second webpage 122b and performs the steps 106b and 106c. For example, the automation engine 144 may emulate entering a text in a text field (e.g., step 106b) and clicking on a submit button (e.g., step 106c). The automation engine 144 launches a third webpage 122c and performs the step 106d on the webpage 122c. For example, the automation engine 144 may emulate clicking on a "complete" button on the webpage 122c. The automation engine 144 may continue to launch one or more webpages 122 to perform other tasks 104, such as task 104b.

In the example of FIG. 2, the automation engine 144 launches a fourth webpage 122d and performs the step 106e on the webpage 122d, and launches a fifth webpage 122e and performs the step 106d on the webpage 122e.

Extracting Metadata from a Video Feed by the Evaluation Engine

The processor 142 executes the evaluation engine 146 in parallel to executing the automation engine 144. The evaluation engine 146 records a video feed 108 that shows the process of the automation engine 144. In other words, the video feed 108 shows the webpage navigation, steps 106, and any other activities emulated and/or performed by the automation engine 144. The video feed 108 may further include other information, such as a machine identifier (e.g., serial number, etc.), timestamps of the webpage navigation, steps 106, and other activities performed by the automation engine 144, resource consumption (e.g., CPU utilization, memory utilization, etc.).

The evaluation engine 146 records the video feed 108 by implementing code that is configured to record the screen of the computing device 120 where the automation engine 144 is executed. Thus, in one embodiment, the evaluation engine 146 may not use a camera to record the video feed 108. The evaluation engine 146 may record the video feed 108 from the backend server 140 or from a processor of the computing device 120 so that personal information of the user 102 that the user 102 inputs to the webpage 122 is not recorded on the video feed 108. The evaluation engine 146 may record the video feed 108 in real time, periodically (e.g., every minute, every five minutes, etc.), or on demand (e.g., by a user, or an event that is triggered when a task is performed by the automation engine 144).

The evaluation engine 146 extracts metadata 114 from the video feed 108. The evaluation engine 146 may feed the video feed 108 to the machine learning algorithm 154 to extract the metadata 114. For example, the evaluation engine 146 may implement video processing and/or image processing to extract the metadata 114.

The metadata 114 may represent the steps 106 and any other data associated with the task 104. The metadata 114 may be represented by a vector 212 that comprises a set of numerical values. The evaluation engine 146 detects the steps 106 from the metadata 114. For example, with respect to the example of FIG. 2, the evaluation engine 146 may detect steps 106a to 106d from the metadata 114.

Determining a Workflow Associated with the Task

To determine a workflow 162 that the task 104 follows and determine a workflow class 174 to which the task 104 belongs, the evaluation engine 146 determines the webpage navigation pattern and steps 106 for performing the task 104. In other words, to identify a workflow 162 that the workflow 112 corresponds to, the evaluation engine determines the webpage navigation pattern and steps 106 for performing the task 104. The evaluation engine 146 uses the training dataset 156 to determine a corresponding workflow 162 that the task 104 follows and a corresponding workflow class 174 to which the task 104 belongs.

In this process, the evaluation engine 146 compares the first set of metadata 114 with each set of metadata 164. To this end, the evaluation engine 146 selects each set of metadata 164 to compare with the first set of metadata 114. The evaluation engine 146 iteratively selects a set of metadata 164 until no more metadata 164 is left for evaluation.

The evaluation engine 146 compares the first set of metadata 114 with the second set of metadata 164. The evaluation engine 146 determines whether the first set of metadata 114 corresponds to the second set of metadata 164. The first set of metadata 114 is represented by a vector 212 that comprises a first set of numerical values. The second set of metadata 164 is represented by a vector 214 that comprises a second set of numerical values.

To determine whether the metadata 114 corresponds to the metadata 164, the evaluation engine 146 compares the vector 212 with vector 214. In this process, the evaluation engine 146 determines whether each numerical value of the vector 212 matches a counterpart numerical value of the vector 214. In other words, the evaluation engine 146 determines a similarity between the vector 212 and vector 214. In one example, the evaluation engine 146 determines that the first set of metadata 114 corresponds to the second set of metadata 164 if each numerical value of the vector 212 matches its counterpart numerical value of the vector 214. In another example, the evaluation engine 146 determines that the first set of metadata 114 corresponds to the second set of metadata 164 if more than threshold percentage of numerical values of the vector 212 (e.g., more than 80%, 85%, etc.) match or within a threshold range (e.g., ±5%, ±10%, etc.) from their corresponding numerical value of the vector 214.

If the evaluation engine 146 determines that the first set of metadata 114 corresponds to the second set of metadata 164, the evaluation engine 146 determines that the steps 106 corresponds to steps 158. In this case, the evaluation engine 146 determines that the task 104 corresponds to the task 160. For example, assuming that the evaluation engine 146 determines that the metadata 114 representing the steps 106a-d corresponds to metadata 164a representing steps 158a. In this case, the evaluation engine 146 determines that the workflow 112 corresponds to workflow 162a, and task 104 corresponds to task 160a.

In this case, the evaluation engine 146 splits the video feed 108 at the breakpoint 210a where the task 104a ends. The evaluation engine 146 records the video recording 168a that shows the task 104a. The evaluation engine 146 may perform a similar operation to split the video feed 108 at multiple breakpoints 210, such as breakpoint 210b. Thus, the evaluation engine 146 may record other video recordings 168, such as video recording 168b that shows the task 104b.

If, however, the evaluation engine 146 determines that metadata 114 does not corresponds to metadata 164, the evaluation engine 146 determines that the first set of steps 106 does not correspond to the second set of steps 158. For example, if the evaluation engine determines that the metadata 114 representing steps 106a-d does not corresponds to metadata 164a representing steps 158a, the evaluation engine 146 determines that the steps 106a-d do not correspond to steps 158a. In this case, the evaluation engine 146 determines whether to select another set of steps 158 to be compared with the steps 106.

If the evaluation engine 146 determines that there is at least one set of metadata 164 is left for evaluation, the evaluation engine 146 compares the at least one set of metadata 164 with the set of metadata 114. If the evaluation engine 146 determines that there is no metadata 164 left for evaluation, the evaluation engine 146 adds the first set of steps 106 as a new workflow 162 to the training dataset 156.

In this manner, the evaluation engine 146 classifies the tasks 104 that are associated with the same workflow 112 into the same workflow class 174. In the example of FIG. 2, the evaluation engine 146 classifies the task 104a to a workflow class 174 to which the task 160a belongs. The evaluation engine 146 may classify other tasks 104, e.g., second task 14b, third task 104 to their corresponding workflow class 174.

In one embodiment, the evaluation engine 146 determines, from the metadata 114, that the metadata 114 is associated with the tasks 104a and 104b. In response, the evaluation engine 146 splits the video feed 108 into the video recordings 168a and 168b, where the video recording 168a shows the task 104a, and the video recording 168b shows the task 104b.

In one embodiment, splitting the video feed 108 into a plurality of video recordings 168 such that each video recording 168 shows a single task 104 comprises determining, from the metadata 114 that the metadata 114 is associated with performing different tasks 104, e.g., tasks 104a and 104b. For example, the evaluation engine 146 determines that the metadata 114 is associated with performing different tasks 104 if the evaluation engine 146 detects that the first task 104a ends and the second task 104b begins right after the first task 104a, by detecting breakpoint 210a. In this case, the evaluation engine 146 identifies a first subset of metadata 114 of the metadata 114 that represents the first task 104a. The evaluation engine 146 identifies a second subset of metadata 114 of the metadata 114 that represents the second task 104b.

The evaluation engine 146 compares the first subset of metadata 114 with the second subset of metadata 114. The evaluation engine 146 determines whether the first subset of metadata 114 corresponds to the second subset of metadata 114. For example, the evaluation engine 146 compares numerical values of the vector 212 that represent the first subset of metadata 114 with the counterpart numerical values of the vector 212 that represent the second subset of metadata 114. The evaluation engine 146 determines that the first subset of metadata 114 does not correspond to the second subset of metadata 114 if the numerical values of the vector 212 that represent the first subset of metadata 114 do not match the counterpart numerical values of the vector 212 that represent the second subset of metadata 114. The evaluation engine 146 determines that the second task 104b is different from the first task 104a if the evaluation engine 146 determines that the first subset of metadata 114 does not correspond to the second subset of metadata 114. In response to determining that the second task 104b is different from the first task 10a, the evaluation engine 146 splits the video feed 108 into the first video recording 168a that shows the first task 104a, and the second video recording 168b that shows the second task 104b.

In one embodiment, the evaluation engine 146 may record a second video feed 108 that shows a fourth task 104 being performed on the webpages 122. The evaluation engine 146 extracts second metadata 114 from the second video feed 108. The second metadata 114 represents the fourth set of steps 106 for performing the fourth task 104. The evaluation engine 146 compares the second metadata 114 (extracted from the second video feed 108) with the first metadata 114 (extracted from the first video feed 108). From the first metadata 114 extracted from the first video feed 108 and second metadata 114 extracted from the second video feed 108, the evaluation engine 146 determines whether the fourth set of steps 106 for performing the first task 104 corresponds to the first set of steps 106 for performing the fourth task 104. If the evaluation engine 146 determines that the first metadata 114 corresponds to the second metadata 114, the evaluation engine 146 classifies the fourth task 104 to the workflow class 174 to which the first task 104 belongs.

In one embodiment, the evaluation engine 146 is configured to classify various video recordings that show the same task 104 into the same task workflow class 174. In this process, if the evaluation engine 146 determines that the first task 104a corresponds to the second task 104b, (in response to determining that the first subset of metadata 114 that represents the first task 104a corresponds to the second subset of metadata 114 that represents the second task 104b, the evaluation engine 146 classifies the first task 104a and the second task 104b a in the same workflow class 174, and the video recording 168a and video recording 168b in the same workflow class 174.

In one embodiment, the video feed 108 may show other tasks 104, such as third task 104. The evaluation engine 146, from the metadata 114, may determine whether the steps 106 for performing the first task 104a corresponds to the steps 106 for performing the third task 104. To this end, the evaluation engine 146 compares the metadata 114 representing the first task 104a with the metadata 114 representing the third task 104. If the evaluation engine 146 determines that the metadata 114 representing the first task 104a corresponds to the metadata 114 representing the third task 104, the evaluation engine 146 classifies the video recording 168 that shows the third task 104 into a task class to which the video recording 168a belongs.

In other words, the evaluation engine 146 may record and access different video feeds 108, and classify tasks 104 (whether from the same or different video feed 108) that have the same workflow 112 into the same task class. The evaluation engine 146 may classify tasks 104 from the same video feed 108 and/or from different video feeds 108. The evaluation engine 146 may classify video recordings 168 that show the same workflow 112 (whether from the same or different video feed 108) into the same workflow class 174. The evaluation engine 146 determines whether two tasks 104 have the same workflow 112, if steps 106 for performing each of those tasks 104 correspond to each other. The evaluation engine 146 determines whether two video recordings 168 show the same workflow 112, if steps 106 shown in each of those video recordings 168 correspond to each other.

Example Operational Flow for Error Detection in Task Workflows

Figure 3:
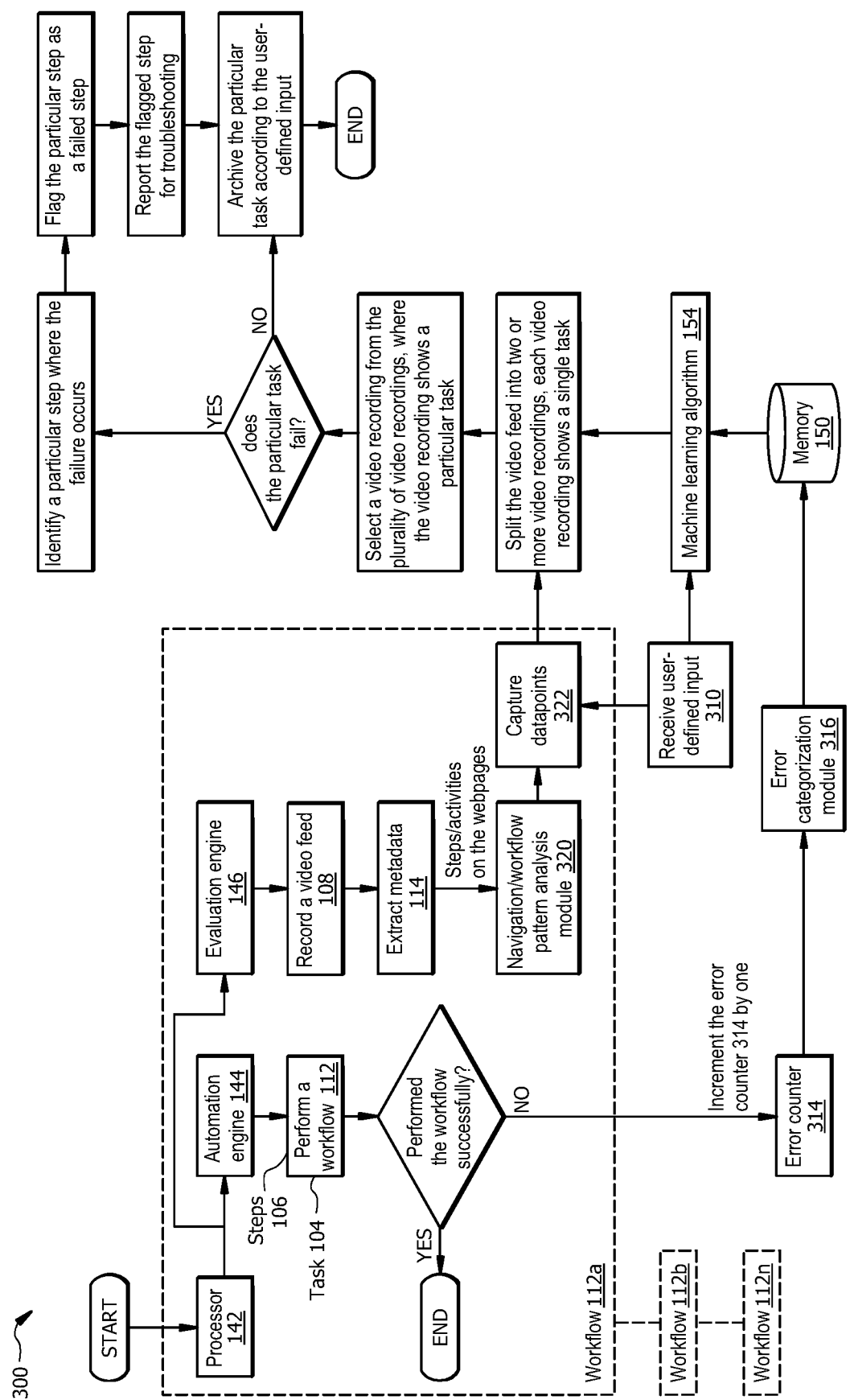
FIG. 3 illustrates an example operational flow of system 100 of FIG. 1 for detecting errors in task workflows shown in a video feed.

FIG. 3 illustrates an example operational flow 300 of system 100 of FIG. 1 for detecting errors 170 in task workflows 162. In one embodiment, the operational flow 300 beings when the processor 142 executes the automation engine 144 in parallel with the evaluation engine 146. The automation engine 144 performs the workflow 112 to accomplish the task 104. For example, the automation engine 144 performs the steps 106 to accomplish a particular task 104, such as approving an account on a webpage 122, etc.

The automation engine 144 determines whether the workflow 112 is performed successfully. If the automation engine 144 determines that the workflow 112 is performed successfully, the operational flow 300 terminates. Otherwise, the automation engine 144 proceeds to record the failed workflow 112. To this end, the automation engine 144 increments the error counter 314 by one.

The automation engine 144 performs error categorization 316 by executing an error categorization module 316 by executing the software instructions 152. In this operation, the automation engine 144 may determine a category or class of the detected error 170. For example, the automation engine 144 may determine that the workflow 112 failed due to a webpage 122 not loading, or any other error 170. The automation engine 144 stores the error categorization 316 in the memory 150. This information may be fed to the machine learning algorithm 154 so that the automation engine 144 and/or the evaluation engine 146 learn the association and correlation between the detected error 170, workflow 112, task 104, steps 106, and other data associated with the workflow 112.

Detecting Workflow Patterns on Webpages from a Video Feed

As described above, in parallel to executing the automation engine 144, the processor 142 executes the evaluation engine 146. The evaluation engine 146 records the video feed 108 that shows the automation engine 144 is performing the workflow 112, and extracts the metadata 114, similar to that described in FIG. 2.

The evaluation engine 146 performs webpage navigation and workflow pattern analysis by webpage navigation and workflow pattern analysis module 320 by executing the software instructions 152. In this process, the evaluation engine 146 detects the steps 106 and other activities performed by the automation engine 144 from the video feed 108, similar to that described above in FIGS. 1 and 2.

The evaluation engine 146 captures datapoints 322 from the metadata 114. The datapoints 322 may include steps 106, breakpoints 210, and/or any other data captured by the evaluation engine 146. For example, the evaluation engine 146 captures breakpoints 210 that separate every two adjacent tasks 104 and/or workflows 112.

The evaluation engine 146 may receive user-defined inputs 310. For example, the user 102 may specify how many video recordings 168 showing tasks 104 should be stored in the memory 150. For example, the user-defined input 310 may specify that to record the three most recent video recordings 168 that are associated with a first workflow 112. In another example, the user-defined input 310 may specify that to record only the most recent video recording 168 that is associated with a second workflow 112. In other examples, the user-defined input 310 may specify to record any number of video recordings 168 associated with a particular workflow 112.

In one embodiment, the processor 142 may repeat these operations for any workflow 112. For example, the processor 142 may perform these operations for workflow 112a, 112b, 122n, etc.

The users 102 and/or the automation engine 144 may use various computing devices 120. Thus, the evaluation engine 146 may adjust processing the video feed 108 based on the screen size of a particular computing device 120 that is being used.

The user-defined inputs 310 may be fed to the machine learning algorithm 154. Thus, the evaluation engine 146 may use the user-defined inputs 310 to record the requested number of video recordings 168. The user-defined inputs 310 may further be added to the datapoints 322.

In one embodiment, the evaluation engine 146 may adjust the number of video recordings 168 to be stored based on the available storage capacity in a computing device where the automation engine 144 is executed, e.g., computing device 120, server 140, etc. For example, if the available storage capacity in the computing device is below a threshold percentage (e.g., below 10%, etc.), the evaluation engine 146 may erase the previous video recordings 168 stored before a contain timestamp, and keep the most recent video recordings 168.

The evaluation engine 146 splits the video feed 108 into two or more video recordings 168, where each video recording 168 shows a single task 104. In this process, the evaluation engine 146 may follow the operational flow 200 described in FIG. 2.

Detecting a Particular Step where a Failure Occurred

The evaluation engine 146 selects a video recording 168 from the plurality of video recordings 168, where the video recording 168 shows a particular task 104. The evaluation engine 146 iteratively selects a video recording 168 from the plurality of video recordings 168 until no more video recording 168 is left for evaluation.

The evaluation engine 146 determines whether a particular task 104 shown in the selected video recording 168 fails. For example, the evaluation engine 146 determines that the particular task 104 fails if an error 170 is detected. In this process, the evaluation engine 146 identifies a subset of the metadata 114 that indicates an element of a webpage 122 (e.g., a button, a hyperlink, etc.) where the task 104 fails is not functional. If the evaluation engine 146 determines that the particular task 104 has failed, the evaluation engine 146 may or may not halt the automation engine 144. If the evaluation engine 146 determines that the particular task 104 has not failed, the evaluation engine 146 archives the particular task 104 according to the user-defined inputs 310.

For example, assume that the particular task 104 is the first task 104 that is associated with a first workflow 112, and the user-defined input 310 specifies to store the most recent video recording 168 that is associated with the first workflow 112. In this example, the evaluation engine 146 stores the most recent video recording 168 that shows the particular task 104 in memory 150.

In another example, assume that the particular task 104 is the second task 104 that is associated with the first workflow 112, and the user-defined input 310 specifies to store the most recent video recording 168 that is associated with the first workflow 112. In this example, the evaluation engine 146 removes the first video recording 168 (stored in memory 150) and replaces it with the most recent video recording 168 in memory 150.

In another example, assume that the user-defined input 310 specifies to only store the three most recent video recordings 168 associated with the first workflow 112. The evaluation engine 146 stores the three most recent video recordings 168 associated with the first workflow 112. If the evaluation engine 146 detects a video recording 168 that is associated with the first workflow 112, the evaluation engine 146 keeps the three most recent video recordings 168 associated with the first workflow 112, and removes the previous video recordings 168 associated with the first workflow 112.

If the evaluation engine 146 determines that the particular task 104 has failed, the evaluation engine 146 identifies a particular step 106 where the failure occurred and/or a particular step 106 that caused the failure. The evaluation engine 146 flags the particular step 106 as a failed step 106. The evaluation engine 146 reports the flagged step 106 to a user 102 for troubleshooting. The evaluation engine 146 archive the video recording 168 of the particular task 104 according to the user-defined input 310, similar to that described above.

The evaluation engine 146 may determine whether to select another video recording 168 to determine whether a task 104 shown in the video recording 168 fails. The evaluation engine 146 may repeat the processes described above to identify one or more steps 106 where one or more tasks 104 fail.

Archiving Video Recordings of Task Workflows based on User Inputs

In one embodiment, whether or nor a task 104 fails, the evaluation engine 146 archives the video recording 168 that shows the task 104. The evaluation engine 146 archives the video recording 168 that shows the task 104 based on the user inputs 130.

For example, assume that the user input 130 specifies to only store the last video recording 168 associated with a particular workflow 112. Also, assume that the evaluation engine 146 detects the task 104 on the video feed 108. The evaluation engine 146 splits the video feed 108 and produces the video recording 168 that shows the task 104. The evaluation engine 146 identifies the timestamp of the video recording 168 from the metadata 114 extracted from the video feed 108.

The evaluation engine 146 identifies the workflow identifier 172 that identifies the workflow 112. The workflow identifier 172 may include a number that is used to identify the workflow 112.

The evaluation engine 146 determines whether there are any video recordings 168 associated with the same workflow 112. Because, in this example, the user input 310 indicates to only store the last video recording 168, if the evaluation engine 146 determines that there are any video recordings 168 associated with the same workflow 112 stored in the memory 150, the evaluation engine 146 removes those video recordings 168, and replaces them with the current video recording 168. In other words, the evaluation engine 146 purges the previous video recordings 168 with the current video recording 168. If the evaluation engine 146 determines that the current video recording 168 is the first video recording 168 associated with the workflow 112, the evaluation engine 146 records the current video recording 168 in the memory 150.

In one embodiment, the evaluation engine 146 may determine whether the automation engine 144 is performing a set of steps 106 as indicated in the automated script 166 to perform a task 104. For example, by processing the metadata 114, the evaluation engine 146 may identify the steps 106, compare the metadata 114 representing each step 106 with metadata associated with steps that are indicated in the automated script 166. The evaluation engine 146 may implement NLP or any other text processing to identify steps indicated in the automated script 166, thus, extract metadata that represent the steps in the automated script 166. If the evaluation engine 146 determines that the metadata 114 that represents a particular step 106 does not match or correspond to metadata that represent a counterpart step indicated in the automated script 116, the evaluation engine determines that the automation engine 144 is not performing the set of step that are indicated in the automated script 166. Thus, the evaluation engine 146 may report those steps to an operator for troubleshooting the automation script 166, evaluation engine 146, and/or the automated scrip 166.

Figure 4:
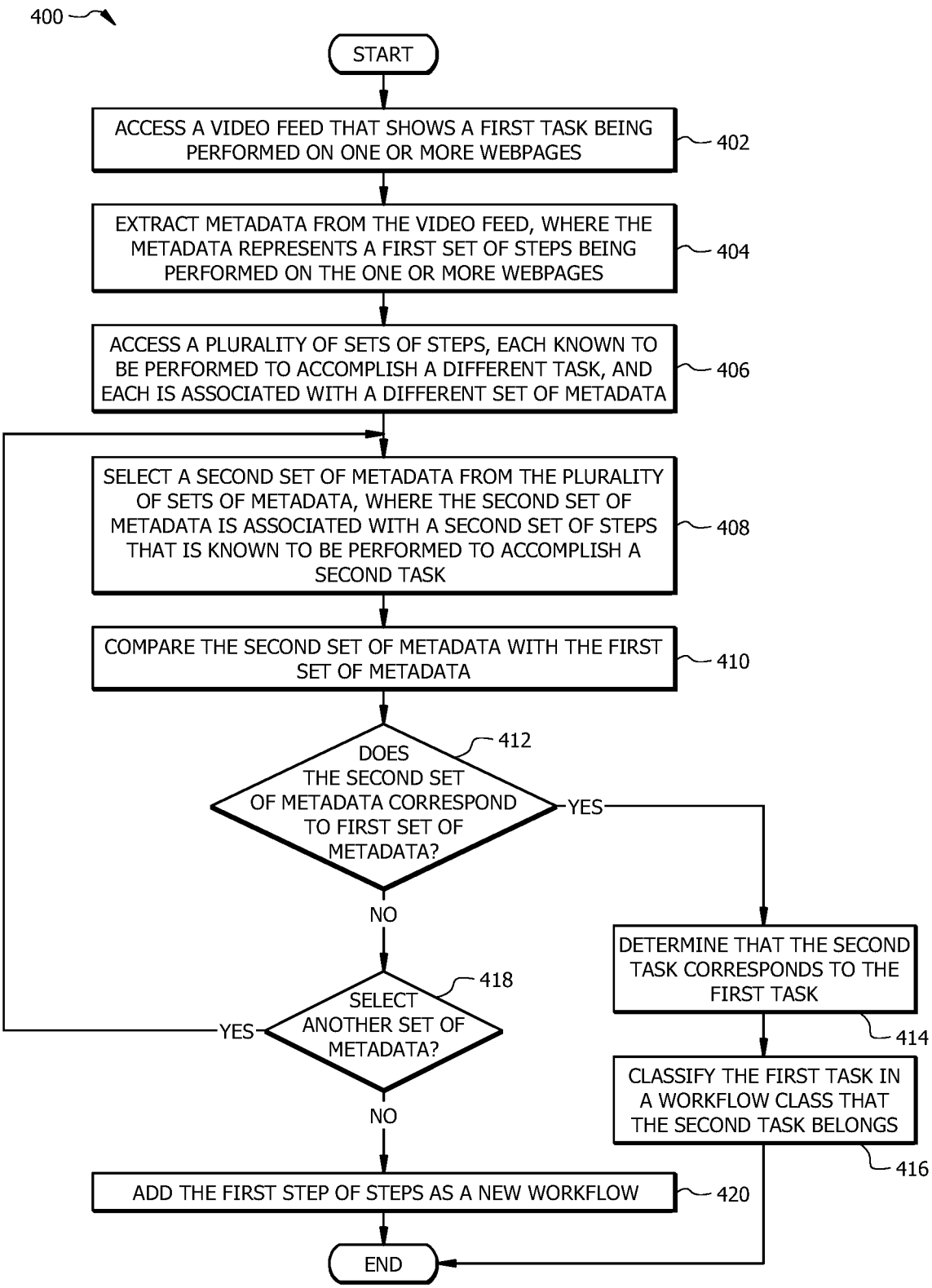
FIG. 4 illustrates an example flowchart of a method for classifying tasks based on workflow patterns detected on webpages from a video feed.

Example Method Classifying Tasks based on Workflow Patterns Detected on Webpages from a Video Feed FIG. 4 illustrates an example flowchart of a method 400 for detecting task workflows 112 from a video feed 108 that shows the workflows 112 being performed on webpages 122, and classifying tasks 104 based on workflow patterns detected on the webpages 122. Modifications, additions, or omissions may be made to method 400. Method 400 may include more, fewer, or other steps. For example, steps may be performed in parallel or in any suitable order. While at times discussed as the system 100, processor 142, automation engine 144, evaluation engine 146, or components of any of thereof performing steps, any suitable system or components of the system may perform one or more steps of the method 400. For example, one or more steps of method 400 may be implemented, at least in part, in the form of software instructions 152 of FIG. 1, stored on non-transitory, tangible, machine-readable media (e.g., memory 150 of FIG. 1) that when run by one or more processors (e.g., processor 142 of FIG. 1) may cause the one or more processors to perform steps 402-422.

Method 400 begins at step 402 where the evaluation engine 146 accesses a video feed 108 that shows a first task 104 being performed on one or more webpages 122. For example, the evaluation engine 146 may record the video feed 108 of the progress of the automation engine 144 performing one or more tasks 104 on the one or more webpages 122, similar to that described in FIGS. 1-3. The first task 104 may be performed on the computing device 120 and/or server 140.

At step 404, the evaluation engine 146 extracts metadata 114 from the video feed 108, where the metadata 114 represents a first set of steps 106 being performed on the one or more webpages 122. For example, the evaluation engine 146 may feed the video feed 108 to the machine learning algorithm 154 to extract the metadata 114. The metadata 114 may further represent timestamps of the steps 106, a serial number associated with a computing device where the task 104 is being performed (e.g., computing device 120, server 140, etc.), memory utilization, CPU utilization of that computing device, and any activity performed by the automation engine 144.

At step 406, the evaluation engine 146 accesses a plurality of sets of steps 158, each known to be performed to accomplish a different task 160, and each is associated with a different set of metadata 164. For example, the evaluation engine 146 accesses the training dataset 156 stored in the memory 150.

At step 408, the evaluation engine 146 selects a second set of metadata 164 from the plurality of sets of metadata 164, where the second set of metadata 164 is associated with a second set of steps 158 that is known to be performed to accomplish a second task 160. The evaluation engine 146 iteratively selects a set of metadata 164 until no metadata 164 is left for evaluation.

At step 410, the evaluation engine 146 compares the second set of metadata 164 with the first set of metadata 114. For example, the evaluation engine 146 compares the vector 212 with vector 214, similar to that described in FIGS. 1 and 2.

At step 412, the evaluation engine 146 determines whether the second set of metadata 164 corresponds to the first set of metadata 114, similar to that described in FIGS. 1 and 2. If the evaluation engine 146 determines that the second set of metadata 164 corresponds to the first set of metadata 114, method 400 proceeds to step 414. Otherwise, method 400 proceeds to step 418.

At step 414, the evaluation engine 146 determines that the second task 160 corresponds to the first task 104.

At step 416, the evaluation engine 146 classifies the first task 104 into a workflow class 174 to which the second task 160 belongs. For example, assuming that the evaluation engine 146 is comparing the steps 106 with the steps 158a. If the evaluation engine 146 determines that the steps 106 corresponds to the steps 158a, the evaluation engine 146 determines that the steps 106 are associated with the workflow 162a. In other words, the workflow 112 of the steps 106 corresponds to the workflow 162a.

At step 418, the evaluation engine 146 determines whether to select another set of metadata 164. The evaluation engine 146 determines to select another set of metadata 164 if at least one set of metadata 164 is left for evaluation. If the evaluation engine 146 determines to select another set of metadata 164, method 400 returns to step 408. Otherwise, method 400 proceeds to step 420.

At step 420, the evaluation engine 146 adds the first set of steps 106 as a new workflow 162. In other words, in this process, the evaluation engine 146 determines that the detected steps 106 and workflow 112 are new to the evaluation engine 146 and the machine learning algorithm 154. Thus, the evaluation engine 146 learns that the new workflow 112 does not correspond to any of the workflows 162, adds the workflow 112 to the training dataset 156, and adapts to detect new workflows 112 based on the newly added workflow 112.

In one embodiment, the evaluation engine 146 may repeat one or more steps of method 400 to determine a task workflow class 172 of each task 104 shown in the video feed 108. In one embodiment, method 400 may further comprise one or more steps to perform the operational flow 300 described in FIG. 3, such as to split the video feed 108 into a plurality of video recordings 168, where each video recording 168 shows a single task 104.

Example Method for Detecting Errors in Task Workflows from a Video Feed

Figure 5:
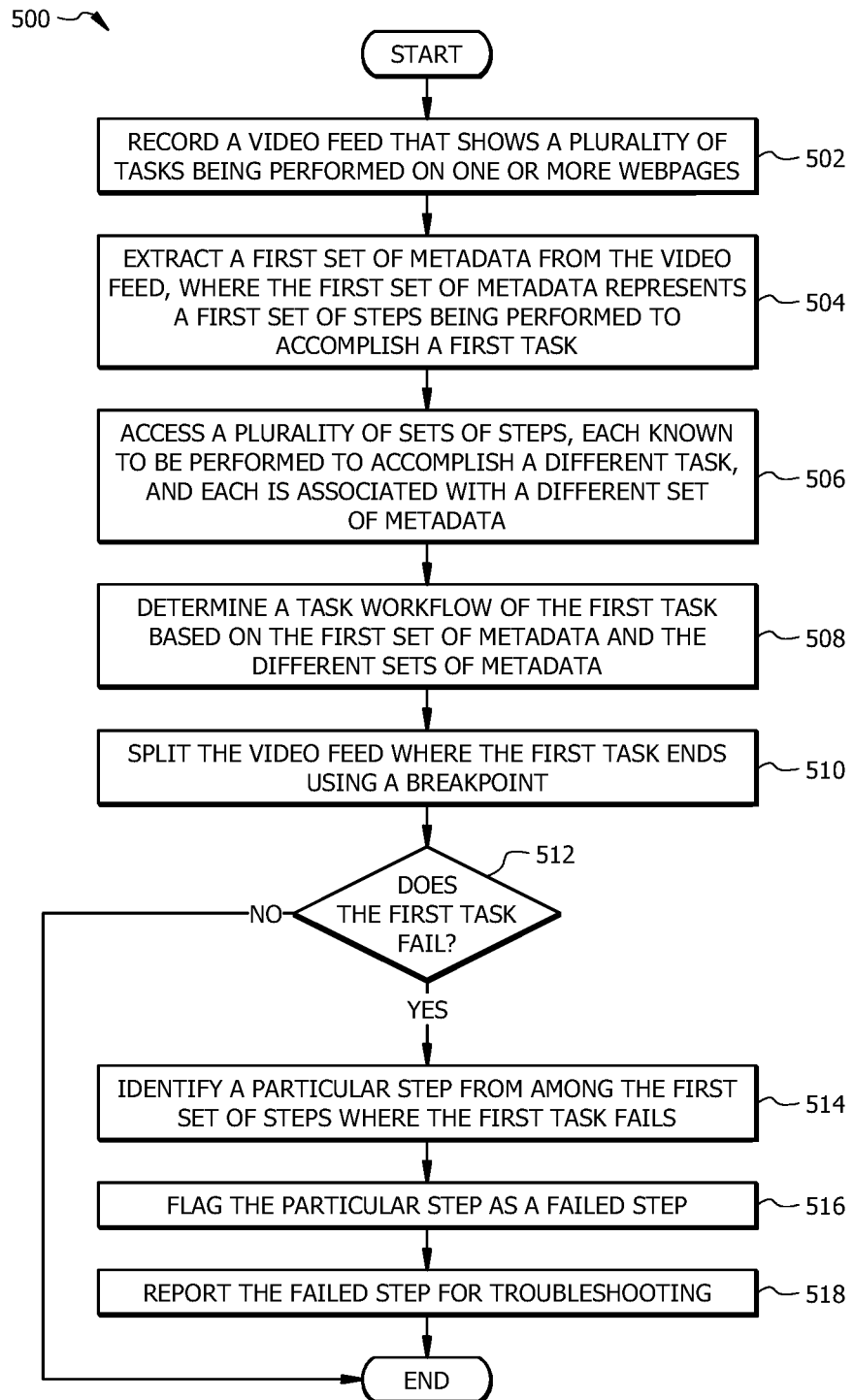
FIG. 5 illustrates an example flowchart of a method for detecting errors in task workflows shown in a video feed.

FIG. 5 illustrates an example flowchart of a method 500 for detecting errors 170 in task workflows 112 being performed on webpages 122 shown in a video feed 108. Modifications, additions, or omissions may be made to method 500. Method 500 may include more, fewer, or other steps. For example, steps may be performed in parallel or in any suitable order. While at times discussed as the system 100, processor 142, automation engine 144, evaluation engine 146, or components of any of thereof performing steps, any suitable system or components of the system may perform one or more steps of the method 500. For example, one or more steps of method 500 may be implemented, at least in part, in the form of software instructions 152 of FIG. 1, stored on non-transitory, tangible, machine-readable media (e.g., memory 150 of FIG. 1) that when run by one or more processors (e.g., processor 142 of FIG. 1) may cause the one or more processors to perform steps 502-518.

Method 500 begins at step 502 where the evaluation engine 146 records a video feed 108 that shows a plurality of tasks 104 being performed on one or more webpages 122, similar to that described in FIGS. 1-4.

At step 504, the evaluation engine 146 extracts a first set of metadata 114 from the video feed 108, where the first set of metadata 114 represents a first set of steps 106 being performed to accomplish a first task 104 on the one or more webpages 122. For example, the evaluation engine 146 may feed the video feed 108 to the machine learning algorithm 154 to extract the metadata 114, similar to that described in FIGS. 1-4.

At step 506, the evaluation engine 146 accesses a plurality of sets of steps 158, each known to be performed to accomplish a different task 160, and each is associated with a different set of metadata 164. For example, the evaluation engine 146 accesses the training dataset 156 stored in the memory 150.

At step 508, the evaluation engine 146 determines a task workflow 112 of the first task 104 based on the first set of metadata 114 and the different sets of metadata 164. In this process, the evaluation engine 146 may perform steps 408 to 420 of method 400 described in FIG. 4. In this process, the evaluation engine 146 selects a second set of metadata 164 from the plurality of sets of metadata 164, where the second set of metadata 164 is associated with a second set of steps 158 that is known to be performed to accomplish a second task 160. The evaluation engine 146 iteratively selects a set of metadata 164 until no metadata 164 is left for evaluation. The evaluation engine 146 compares the second set of metadata 164 with the first set of metadata 114. For example, the evaluation engine 146 compares the vector 212 with vector 214, similar to that described in FIGS. 1 and 2. The evaluation engine 146 determines whether the second set of metadata 164 corresponds to the first set of metadata 114, similar to that described in FIGS. 1 and 2. If the evaluation engine 146 determines that the second set of metadata 164 corresponds to the first set of metadata 114, the evaluation engine 146 determines that the first task 104 has the same task workflow as the second task 160, similar to that described in FIGS. 1 and 2. Otherwise, the evaluation engine 146 determines whether to select another set of metadata 164. The evaluation engine 146 determines to select another set of metadata 164 if at least one set of metadata 164 is left for evaluation. If the evaluation engine 146 determines that no more metadata 164 is left for evaluation, the evaluation engine 146 determines that the task 104 has a new workflow 112, and adds the first set of steps 106 as a new workflow 162 to the training dataset 156, similar to that described in FIGS. 1 and 2.

At step 510, the evaluation engine 146 splits the video feed 108 where the first task 104 ends using a breakpoint 210. In this process, the evaluation engine 146 produces a video recording 168 that shows the first task 104. In one embodiment, the evaluation engine 146 may split the video feed 108 into a plurality of video recordings 168, such that each video recording 168 shows a single task 104, similar to that described in FIGS. 1 and 2.

At step 512, the evaluation engine 146 determines whether the first task 104 fails. In this process, the evaluation engine 146 may follow the operational flow 300 described in FIG. 3. For example, the evaluation engine 146 determines that the first task 104 fails if a webpage 122 on which the first task 104 is being performed crashes. In other examples, the evaluation engine 146 determines that the first task 104 fails if any of the errors 170 are detected, similar to that described in FIGS. 1-3. If the evaluation engine 146 determines that the first task 104 fails, method 500 proceeds to step 514. Otherwise, method 500 terminates.

At step 514, the evaluation engine 146 identifies a particular step 106 from among the set of steps 106 where the first task 104 fails. In this process, the evaluation engine 146 identifies a subset of the metadata 114 that indicates an element of a webpage 122 (e.g., a button, a hyperlink, etc.) is not functional. In this manner, the evaluation engine 146 identifies the subset of metadata 114 that indicates which element's failure in its operation has lead to the failure in the first task 104, similar to that described in FIG. 3.

At step 516, the evaluation engine 146 flags the particular step 106 as a failed step 106. For example, the evaluation engine 146 adds or associates a flag parameter and/or text to the failed step 106, where the flag parameter and/or text indicates that the particular step 106 is where the task 104 fails. The evaluation engine 146 may also record a timestamp where the first task 104 fails.

At step 518, the evaluation engine 146 reports the failed step 106 for troubleshooting. In one embodiment, the evaluation engine 146 may repeat one or more steps of method 500 to determine a task workflow class 172 of each task 104 shown in the video feed 108, determine whether each task 104 fails, and flag failed steps 106, similar to that described in FIG. 3.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for classifying tasks based on workflow patterns detected on webpages, comprising:
    a memory operable to store a first set of steps known to be performed to accomplish a first task on one or more webpages, wherein the first set of steps is represented by a first set of metadata; and
    a processor, operably coupled with the memory, and configured to:
        access a video feed that shows a plurality of steps being performed to accomplish a plurality of tasks on the one or more webpages, wherein:
            each task from among the plurality of tasks is associated with a different set of steps from among the plurality of steps, and
            the plurality of tasks comprises a second task;
        extract a second set of metadata from the video feed, wherein the second set of metadata represents a second set of steps being performed on the one or more webpages;
        compare the second set of metadata with the first set of metadata;
        determine whether the second set of metadata corresponds to the first set of metadata;
        in response to determining that the second set of metadata corresponds to the first set of metadata:
            determine that the second task corresponds the first task; and
            classify the second task in a first workflow class to which the first task belongs.

2. The system of claim 1, wherein the first task comprises creating an account, accessing an account, approving an account, or rejecting an account.

3. The system of claim 1, wherein the first set of steps comprises at least two of inputting a first text in a first text field, selecting a first button on a webpage from among the one or more webpages, and selecting a first hyperlink on a webpage from among the one or more webpages.

4. The system of claim 1, wherein:
    the first set of metadata is represented by a first vector that comprises a first set of numerical values, and
    the second set of metadata is represented by a second vector that comprises a second set of numerical values; and
    determining whether the first set of metadata corresponds to the second set of metadata comprises:
        determining whether each numerical value of the first vector matches a counterpart numerical value of the second vector; and
        in response to determining that each numerical value of the first vector matches the counterpart numerical value of the second vector, determining that the first set of metadata corresponds to the second set of metadata.

5. The system of claim 1, wherein the processor is further configured to split the video feed into a plurality of video recordings, such that each video recording from among the plurality of video recordings shows a single task from among the plurality of tasks.

6. The system of claim 5, wherein:
    the video feed further shows a third task being performed on the one or more webpages,
    the second set of metadata further represents a third set of steps for performing the third task; and
    splitting the video feed into the plurality of video recordings such that each video recording from among the plurality of video recordings shows a single task from among the plurality of tasks comprises:
        determining, from the second set of metadata, that the second set of metadata is associated with performing the second task and the third task;
        identifying a first subset of metadata from among the second set of metadata that represents the second task;
        identifying a second subset of metadata from among the second set of metadata that represents the third task;
        comparing the first subset of metadata with the second subset of metadata;
        determining that the first subset of metadata does not correspond to the second subset of metadata;
        in response to determining that the first subset of metadata does not correspond to the second subset of metadata, determining that the second task is different from the third task;
        in response to determining that the second task is different from the third task, splitting the video feed into a first video recording and a second video recording, such that:
            the first video recording shows the second task is being performed; and
            the second video recording shows the third task is being performed.

7. The system of claim 6, wherein:
    the memory is further operable to store a third video recording that shows the first task, and
    the processor is further configured to classify video recordings that show the same task into the same workflow class, wherein classifying video recordings that show the same task into the same workflow class comprises, in response to determining that the second task corresponds to the first task, classifying the second video recording and the third video recording into the first workflow class.

8. The system of claim 1, wherein the processor is further configured to:
    detect that the second task has failed;
    in response to detecting that the second task has failed, identify a particular step from among the second set of steps that failed;
    in response to determining the particular step that failed:
        flag the particular step as a failed step;
        increase an error counter for performing the second task by one; and
        report the flagged step for troubleshooting.

9. A method for classifying tasks based on workflow patterns detected on webpages, comprising:
    accessing a first set of steps known to be performed to accomplish a first task on one or more webpages, wherein the first set of steps is represented by a first set of metadata; accessing a video feed that shows a plurality of steps being performed to accomplish a plurality of tasks on the one or more webpages, wherein:
  each task from among the plurality of tasks is associated with a different set of steps from among the plurality of steps, and
  the plurality of tasks comprises a second task;
extracting a second set of metadata from the video feed, wherein the second set of metadata represents a second set of steps being performed on the one or more webpages;
comparing the second set of metadata with the first set of metadata;
  determining whether the second set of metadata corresponds to the first set of metadata;
in response to determining that the second set of metadata corresponds to the first set of metadata:
  determining that the second task corresponds the first task; and
  classifying the second task in a first workflow class to which the first task belongs.

10. The method of claim 9, wherein the first task comprises creating an account, accessing an account, approving an account, or rejecting an account.

11. The method of claim 9, wherein the first set of steps comprises at least two of inputting a first text in a first text field, selecting a first button on a webpage from among the one or more webpages, and selecting a first hyperlink on a webpage from among the one or more webpages.

12. The method of claim 9, wherein:
  the first set of metadata is represented by a first vector that comprises a first set of numerical values, and the second set of metadata is represented by a second vector that comprises a second set of numerical values; and
  determining whether the first set of metadata corresponds to the second set of metadata comprises:
    determining whether each numerical value of the first vector matches a counterpart numerical value of the second vector; and
    in response to determining that each numerical value of the first vector matches the counterpart numerical value of the second vector, determining that the first set of metadata corresponds to the second set of metadata.

13. The method of claim 9, further comprising splitting the video feed into a plurality of video recordings, such that each video recording from among the plurality of video recordings shows a single task from among the plurality of tasks.

14. The method of claim 13, wherein:
  the video feed further shows a third task being performed on the one or more webpages,
the second set of metadata further represents a third set of steps for performing the third task; and
  splitting the video feed into the plurality of video recordings such that each video recording from among the plurality of video recordings shows a single task from among the plurality of tasks comprises:
    determining, from the second set of metadata, that the second set of metadata is associated with performing the second task and the third task;
    identifying a first subset of metadata from among the second set of metadata that represents the second task;
    identifying a second subset of metadata from among the second set of metadata that represents the third task;
    comparing the first subset of metadata with the second subset of metadata;
    determining that the first subset of metadata does not correspond to the second subset of metadata;
    in response to determining that the first subset of metadata does not correspond to the second subset of metadata, determining that the second task is different from the third task;
    in response to determining that the second task is different from the third task, splitting the video feed into a first video recording and a second video recording, such that:
      the first video recording shows the second task is being performed; and
      the second video recording shows the third task is being performed.

15. The method of claim 14, further comprising classifying video recordings that show the same task into the same workflow class, wherein classifying video recordings that show the same task into the same workflow class comprises, in response to determining that the second task corresponds to the first task, classifying the second video recording and a third video recording that shows the first task into the first workflow class.

16. The method of claim 9, further comprising:
  detecting that the second task has failed;
  in response to detecting that the second task has failed, identifying a particular step from among the second set of steps that failed;
  in response to determining the particular step that failed:
    flagging the particular step as a failed step;
    increasing an error counter for performing the second task by one; and
    reporting the flagged step for troubleshooting.

17. A non-transitory computer-readable medium storing instructions that when executed by a processor cause the processor to:
  access a first set of steps known to be performed to accomplish a first task on one or more webpages, wherein the first set of steps is represented by a first set of metadata; access a video feed that shows a plurality of steps being performed to accomplish a plurality of tasks on the one or more webpages, wherein:
    each task from among the plurality of tasks is associated with a different set of steps from among the plurality of steps, and
    the plurality of tasks comprises a second task;
  extract a second set of metadata from the video feed, wherein the second set of metadata represents a second set of steps being performed on the one or more webpages;
compare the second set of metadata with the first set of metadata;
  determine whether the second set of metadata corresponds to the first set of metadata;
in response to determining that the second set of metadata corresponds to the first set of metadata:
  determine that the second task corresponds the first task; and
  classify the second task in a first workflow class to which the first task belongs.

18. The computer program of claim 17, wherein the first task comprises creating an account, accessing an account, approving an account, or rejecting an account.

19. The non-transitory computer-readable medium of claim 17, wherein the first set of steps comprises at least two of inputting a first text in a first text field, selecting a first button on a webpage from among the one or more webpages, and selecting a first hyperlink on a webpage from among the one or more webpages.

20. The non-transitory computer-readable medium of claim 17, wherein the instructions when executed by the processor, further cause the processor to split the video feed into a plurality of video recordings, such that each video recording from among the plurality of video recordings shows a single task from among the plurality of tasks.

\* \* \* \* \*